(12) United States Patent
Williams

(10) Patent No.: US 10,293,515 B2
(45) Date of Patent: May 21, 2019

(54) COLORATION OF ACETYLATED WOOD

(71) Applicant: Electronics for Imaging, Inc., Fremont, CA (US)

(72) Inventor: David J. Williams, Bradford (GB)

(73) Assignee: ELECTRONIC FOR IMAGING, INC., Fremont, CA (US)

(*) Notice: Subject to any disclaimer, the term of this patent is extended or adjusted under 35 U.S.C. 154(b) by 0 days.

(21) Appl. No.: 15/654,473

(22) Filed: Jul. 19, 2017

(65) Prior Publication Data

US 2018/0162008 A1 Jun. 14, 2018

Related U.S. Application Data

(60) Provisional application No. 62/431,793, filed on Dec. 8, 2016.

(51) Int. Cl.
| | |
|---|---|
| B27K 5/02 | (2006.01) |
| B27K 3/08 | (2006.01) |
| B27K 3/34 | (2006.01) |
| B27K 5/00 | (2006.01) |
| B27K 3/02 | (2006.01) |
| C08B 3/06 | (2006.01) |
| C08B 3/22 | (2006.01) |
| C08H 8/00 | (2010.01) |

(52) U.S. Cl.
CPC .......... *B27K 3/08* (2013.01); *B27K 3/02* (2013.01); *B27K 3/34* (2013.01); *B27K 3/346* (2013.01); *B27K 5/00* (2013.01); *B27K 5/0055* (2013.01); *B27K 5/0085* (2013.01); *B27K 5/02* (2013.01); *C08B 3/06* (2013.01); *C08B 3/22* (2013.01); *C08H 8/00* (2013.01)

(58) Field of Classification Search
CPC ... B27K 5/02; B27K 3/02; B27K 5/00; B27K 5/0055; B27K 3/08
See application file for complete search history.

(56) References Cited

U.S. PATENT DOCUMENTS

| | | |
|---|---|---|
| 6,348,089 B1 | 2/2002 | Marx et al. |
| 6,602,451 B1 | 8/2003 | Korai et al. |
| 6,632,326 B1 | 10/2003 | Hirano et al. |
| 8,603,576 B2 | 12/2013 | Leach et al. |
| 2009/0293761 A1 | 12/2009 | Richardson et al. |
| 2010/0331531 A1 | 12/2010 | Mykytka et al. |

(Continued)

FOREIGN PATENT DOCUMENTS

CN 102618084 A 8/2012

OTHER PUBLICATIONS

Dyeing Properties of Acetylated Wood with Red Disperse Dyes dated 2011.*

(Continued)

*Primary Examiner* — Eisa B Elhilo
(74) *Attorney, Agent, or Firm* — Perkins Coie LLP

(57) ABSTRACT

Techniques and products are described for coloring acetylated wood products. An acetylated wood product can be impregnated by a coloring medium within a chamber and the colorant or colorants contained within the coloring medium can be fixed to the acetylated wood product by the application of heat or by application of radio frequency radiation to color any external surface or interior region of the acetylated wood product which has been impregnated by the coloring medium.

36 Claims, 5 Drawing Sheets

(56) References Cited

U.S. PATENT DOCUMENTS

2014/0227503 A1  8/2014  Pol et al.
2016/0009000 A1  1/2016  Sanderson

OTHER PUBLICATIONS

Zhao, Ying, et al., "Dyeing Properties of Acetylated Wood with Red Disperse Dyes", Advanced Materials Research vols. 335-336, Sep. 2011, pp. 1061-1066.
Zhao, Ying, et al., "Dyeing of Acetylated Wood With Disperse Dyes", Wood and Fiber Science, Issue 3, (Jul. 2014), Jul. 2014.

* cited by examiner

COLORATION OF ACETYLATED WOOD

CLAIM FOR PRIORITY

This application claims priority to U.S. Provisional Patent Application No. 62/431,793, entitled "Weather Resistant Coloration of Acetylated Wood," by Williams, and filed on Dec. 8, 2016. The content of the above-identified application is incorporated herein by reference in its entirety.

TECHNICAL FIELD

The disclosure relates to the treatment of wood, and in particular the coloration of fully or partially acetylated wood.

BACKGROUND

Softwoods, such as spruce, pine, fir, larch, and cedar, are often used for interior and exterior construction due to their low cost. However, softwoods are susceptible to damage from insects (e.g., termites, woodworm, marine boring worms, etc.) and fungal degradation (e.g., "brown rot" and "white rot") that can reduce their useful service life. Residual resins can also "bleed" through and stain surface coatings on the softwoods. Additionally, under conditions of variable atmospheric or ambient humidity, softwoods are susceptible to dimensional change which in turn can result in a change in shape and size of manufactured articles. This can, for example, cause doors and windows to "stick" and, therefore, be difficult to open or close. These same dimensional changes in unmodified wood and the associated constant expansion and contraction during typical service are one of the prime causes of flaking and cracking of applied surface coatings. Some hardwoods also have similar problems.

Acetylated wood is a modified wood product most commonly manufactured from softwoods such as *Radiata* Pine via acetylation. Acetylation is a chemical process involving a chemical reaction between an acetylation agent, most commonly acetic anhydride, and wood under conditions of high temperature and pressure. This process esterifies a large proportion of the accessible hydroxyl groups present within the cell walls of the wood structure. The acetylated wood retains a similar lignin content as before treatment, which allows the acetylated wood to maintain structural rigidity. However, in contrast to softwood before acetylation, acetylated wood is more resistant to dimensional change when subjected to variable environmental humidity and temperature which means reduced expansion, contraction and warping. This improved dimensional stability not only reduces the likelihood of sticking or excessively loose windows and doors but can also improve the service life of applied external coatings. Additionally, compared to softwoods in their natural untreated state, acetylated wood is inherently more resistant to attack by insects and to fungal degradation, allowing for it to be used for exterior construction without the need for additional preservation treatments or coatings. Moreover, the *Radiata* Pine and many other softwoods which can be used to produce acetylated wood are fast-growing and can be harvested sustainably.

However, acetylated softwoods can lack the visually aesthetic qualities of hardwoods. For example, acetylated softwood is usually pale in color and can become even paler as it ages and is exposed to natural weathering. The surface of acetylated wood can also be spoiled by the appearance of surface mold and other discolorations. By contrast, hardwoods tend to hide blemishes better by virtue of their aesthetically more pleasing and, usually, darker color.

SUMMARY

Some of the subject matter described herein includes a method for the coloration of an acetylated wood product, including providing the acetylated wood product into a suitably engineered chamber; providing a solution or dispersion of one or more colorants carried in a liquid medium (hereinafter also referred to as the 'coloring medium') into the chamber; causing the coloring medium to impregnate the acetylated wood product and then heating or irradiating the impregnated acetylated wood product in such a manner as to 'fix' the colorant(s) to any surfaces or regions, exterior or interior, of the acetylated wood product which have been impregnated by the coloring medium in such a way that they are rendered resistant to removal by wet treatments or wet conditions such as those, for example, encountered during exposure to wet weather.

In some implementations, the method includes reducing the pressure in the chamber to remove air from the acetylated wood product, wherein the coloring medium replaces the air removed from the acetylated wood product thereby causing the coloring medium to penetrate deeper into the interior of the acetylated wood product.

In some implementations, after introduction of the coloring medium into the chamber, positive pressure is applied to the chamber to further accelerate the penetration of the coloring medium into the interior of the acetylated wood product or to cause the colorant(s) contained within the coloring medium to penetrate further into the interior of the acetylated wood than they would in the absence of positive pressure.

In some implementations, where it is desired to control the depth of penetration of the coloring medium into the acetylated wood product the impregnation is carried out by introducing the coloring medium into the chamber without the prior application of vacuum and then positive pressure is applied.

In some implementations the impregnation of the coloring medium into the acetylated wood is achieved by an infusion process such as that which occurs, for example, by immersing the acetylated wood product in the coloring medium (dipping) or by spraying the coloring medium onto the acetylated wood product.

In some implementations, after impregnating the acetylated wood product with the coloring medium the heating temperature used to fix the colorant(s) can reach 90° C. or more.

In some implementations, wherein the coloring medium penetrates into the interior of the acetylated wood product, the method includes replacing some or all of the coloring medium that did not penetrate into the acetylated wood product with water or a suitable solvent or a suitable water/solvent mix, wherein the water or solvent or water/solvent mix is heated or pre-heated to bring about fixation of colorant(s) to those surfaces and regions, exterior or interior, of the acetylated wood product which have been impregnated by the coloring medium.

In some implementations, after impregnation with the coloring medium and before fixation of the colorant(s), excess coloring medium can be removed from the acetylated wood product by the application of a secondary vacuum so as to reduce the total energy consumption during subsequent heat fixation.

In some implementations the heat or energy necessary to bring about fixation of colorants to the acetylated wood can be provided by hot liquids, steam, radio frequency radiation including microwave radiation, ultrasonic waves, hot air, or hot inert gas.

In some implementations the acetylated wood product can be transferred to a different vessel or apparatus to carry out fixation of the colorants.

In some implementations, the method includes subsequent drying of the newly colored acetylated wood product, wherein any colored surfaces or regions, exterior or interior, of the acetylated wood product retain their color after the drying.

In some implementations after fixation of the colorant(s) as described herein, excess water, solvent or water/solvent mix can be removed from the acetylated wood product so as to accelerate drying of the acetylated wood product and to reduce the energy consumed by the drying process.

In some implementations, the coloring medium contains one or more colorant(s) selected from one or more of inorganic pigments, organic pigments, disperse dyes, vat dyes, solvent dyes, or sulfur dyes either dissolved or as a particulate dispersion in a liquid medium.

In a preferred implementation the liquid medium used to prepare the coloring medium is comprised mainly of water.

In some implementations, up to and including 100% of the particles of the colorant(s) have diameters between 0.001 micrometers (microns) to 25 micrometers. In a preferred implementation, up to and including 100% of the particles of the colorant(s) have diameters between 0.001 micrometers (microns) to 5 micrometers.

In some implementations the coloring medium may also contain other chemical additives which assist, for example, in enhancing the coloration process or which confer other beneficial properties on the resulting colored acetylated wood product.

Some of the subject matter described herein also includes an acetylated wood product with colored exterior surfaces or both colored exterior surfaces and colored internal regions prepared by a process including the steps of: providing the acetylated wood product into a suitably engineered chamber; providing a solution or dispersion of one or more colorant(s) carried in a liquid medium (hereinafter also referred to as the 'coloring medium') into the chamber, causing the coloring medium to impregnate the interior of the acetylated wood and then heating or irradiating the impregnated acetylated wood product in such a manner as to 'fix' the colorant(s) to any surfaces or regions, exterior or interior, of the acetylated wood product which have been impregnated by the coloring medium in such a way that they are rendered resistant to removal by subsequent wet treatments or wet conditions such as those, for example, encountered during exposure to wet weather. In some implementations, the process includes reducing the pressure in the chamber to remove air from the acetylated wood product, wherein the coloring medium replaces the air removed from the acetylated wood product thereby causing the coloring medium to penetrate deeper into the interior of the acetylated wood product.

In some implementations, after introduction of the coloring medium into the chamber, positive pressure is applied to the chamber to further accelerate the impregnation of the coloring medium into the interior of the acetylated wood product or to cause the colorant(s) contained within the coloring medium to penetrate further into the interior than they would in the absence of positive pressure.

In some implementations, where it is desired to control the depth of penetration of the coloring medium into o the acetylated wood product the impregnation is carried out by introducing the coloring medium into to chamber without the prior application of vacuum and the positive pressure is applied.

In some implementations the impregnation of the coloring medium into the acetylated wood is achieved by an infusion process such as that which occurs, for example, by immersing the acetylated wood product in the coloring medium (dipping) or by spraying the coloring medium onto the acetylated wood product.

In some implementations, after impregnating the acetylated wood product with the coloring medium the heating temperature can reach 90° C. or more.

In some implementations wherein the coloring medium penetrates into the interior of the acetylated wood product the method includes replacing some or all of the coloring medium that did not penetrate into the acetylated wood product with water or a suitable solvent or a suitable water/solvent mix, wherein the water or solvent or water/solvent mix is heated or pre-heated to bring about fixation of colorant(s) to those surfaces and regions, exterior or interior, of the acetylated wood product which have been impregnated by the coloring medium.

In some implementations, after impregnating with the coloring medium and before fixation of the colorants, excess coloring medium can be removed from the acetylated wood product by the application of a secondary vacuum so as to reduce the total energy consumption during subsequent heat fixation.

In some implementations the heat or energy necessary to bring about fixation of colorants to the acetylated wood can be provided by hot liquids, steam, radio frequency radiation including microwave radiation, ultrasonic waves, hot air, or hot inert gas.

In some implementations the acetylated wood product can be transferred to a different vessel or apparatus to carry out fixation of the colorants.

In some implementations, the process includes subsequent drying of the newly colored acetylated wood product, wherein any colored surfaces or regions, exterior or interior, of the acetylated wood product retain their color after the drying.

In some implementations, the coloring medium contains one or more colorant(s) selected from one or more of inorganic pigments, organic pigments, disperse dyes, vat dyes, solvent dyes, or sulfur dyes either dissolved or as a particulate dispersion in a liquid medium.

In a preferred implementation the liquid medium used to carry the water is comprised mainly of water.

In some implementations, the colored acetylated wood of [118] contains colorant(s) of which up to and including 100% of particles originally had diameters between 0.001 micrometers (microns) to 25 micrometers in the coloring medium.

In a preferred implementation the colored acetylated wood of [118] contains colorant(s) of which up to and including 100% of particles originally had diameters between 0.001 micrometers (microns) to 5 micrometers in the coloring medium described in [118].

In some implementations the colored acetylated wood of [118] may also contain other chemical additives which assisted, for example in enhancing the coloration process or which confer other beneficial properties on the resulting colored acetylated wood.

DETAILED DESCRIPTION

Figure 1:
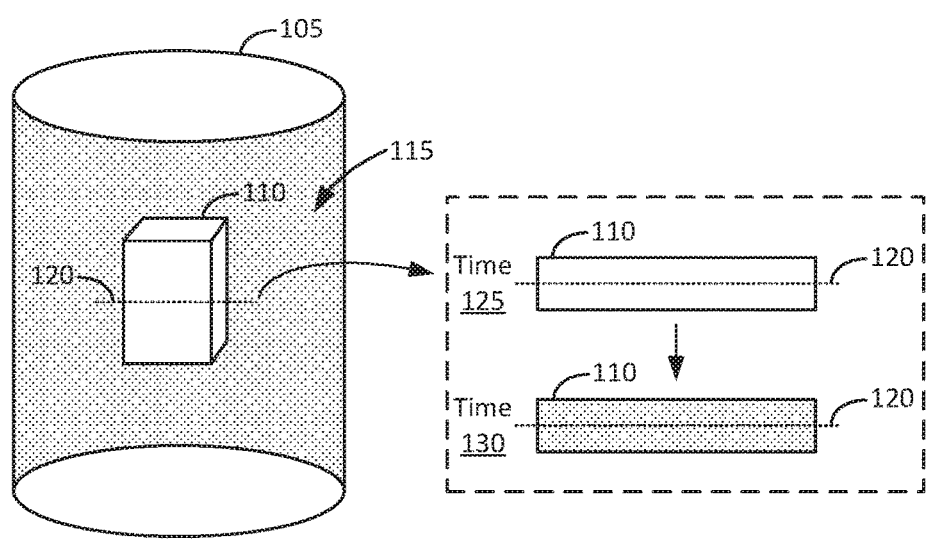
FIG. 1 illustrates an example of the coloration of acetylated wood.

This disclosure describes techniques for the coloration of acetylated wood products wherein a coloring medium is caused, by one or more techniques, to impregnate the surface, or both the surface and at least part of the interior of the acetylated wood product and wherein, by the subsequent application of one or modes of heating or irradiation, the colorants contained within the coloring medium are subsequently fixed to those surfaces or regions of the acetylated wood impregnated by the coloring medium in such a way that they are rendered resistant to removal by wet treatments or wet conditions such as those, for example, encountered during exposure to wet weather. An unexpected element in this application is the fixation, by heat, without the use of any type of binder or resin or other polymerisable chemicals, of colorant types which have no affinity for acetylated wood at ambient temperatures and for which, for the colorant types exemplified, there is no ready explanation of the mode of 'fixation.'

Thus in one example, an acetylated wood product can be colored (e.g., pigmented or dyed) on both on its exterior surfaces and within its interior (e.g., within the cross-section or inside of the acetylated wood product) by providing a solution or dispersion of colorant (e.g., a pigment or dye) carried in a liquid medium (e.g., water, a solvent or a blend of water with compatible co-solvents) to an acetylated wood product within a suitable treatment chamber. When the acetylated wood product is subjected to appropriate conditions of vacuum or partial vacuum and then immersed into the liquid coloring medium followed by the optional application of positive pressure the coloring medium can penetrate through the exterior and into the interior of the acetylated wood. Alternatively, where it is desired to limit the degree of penetration of the coloring medium into the interior of the acetylated wood product, the impregnation can be carried out without the use of vacuum in which case the coloring medium is provided to the acetylated wood product at atmospheric pressure and the impregnation carried out by simple infusion or, alternatively, by infusion followed by the additional application of positive pressure. The contents of the chamber can then be heated so as to fix the colorant(s) to the exterior surfaces and at least part of the interior of the acetylated wood product. That is, the acetylated wood product can, through judicious choice of impregnation method, be colored throughout its interior to its exterior. In the case described, if the impregnated acetylated wood product is heated in the same coloring medium used for the impregnation, the exterior of the acetylated wood product is rendered more intensely colored than the interior. In order to achieve a more closely balanced intensity of color between the exterior and the interior of the acetylated wood product the heating phase can be carried out in an uncolored liquid medium, rather than in the original coloring medium. In this case all or part of the coloring medium can be removed after the impregnation and replaced by an amount of fresh uncolored liquid medium sufficient to completely immerse the acetylated wood product. Although water is a preferred liquid medium for both the impregnation and subsequent heat fixation, in further implementations of the invention the liquid medium used for the heat fixation stage need not necessarily be of the same composition as that used to prepare the coloring medium. Subsequent application of heat brings about fixation of color to the surface and interior of the acetylated wood product. Although the heat fixation exemplified is carried out in the same chamber as that used for the impregnation, in a further implementation the impregnated acetylated wood can be removed to a different chamber for the heat fixation process which can be preferred if the fixation is carried out with steam, hot air, hot inert gas, microwave radiation, radio frequency radiation of ultrasonic waves. Unexpectedly the fixation of colorant is achieved without the use of binder or resin or other polymerisable chemicals. The liquid medium used for this heat treatment can optionally include co-solvent(s) or dispersants, surfactants and buffers as well as other additives designed to confer modified surface properties to the colored acetylated wood product such as hydrophobicity, ultraviolet (UV) protection or stain blocking.

For example, FIG. 1 is a schematic illustration of the coloration of acetylated wood. In FIG. 1, chamber 105 is a simplified representation of a chamber loaded with acetylated wood product (e.g., a pack of cut acetylated wood pieces) 110 disposed within. When acetylated wood 110 is first placed within chamber 105, it can be a pale yellow color on its exterior surface as well as its interior. However, upon reducing the pressure within chamber 105, providing the solution or dispersion of colorant(s) for the coloring medium 115 to impregnate the acetylated wood 110, and heating the acetylated wood 110 after it has been impregnated with the coloring medium 115, some of the colorant(s) contained in the coloring medium 115 can be fixed to the exterior and interior of the acetylated wood 110. As a result, acetylated wood 110 at time 125 before introduction of the colorant in FIG. 1 can have a cross-section 120 depicted as being pale but, following impregnation and heating, at time 130, the colorant(s) contained within the coloring medium 115 can be fixed in place, and therefore, allows for the coloration of the interior of acetylated wood 110 as shown by cross-section 120.

Without heating or irradiating the impregnated acetylated wood 110, colorant(s) contained within the coloring medium 115 can migrate away from the interior to the exterior surface of the acetylated wood 110 as it dries. This would result in the interior of the acetylated wood 110 losing most of the color provided to it by impregnation with the coloring medium 115. That is, without heating the impregnated acetylated wood 110, the interior of the acetylated wood 110 would be very significantly less colored than an example which has been suitably heated as depicted by the example at time 130 in FIG. 1.

Coloration of the exterior and interior of acetylated wood 110 allows for the colored acetylated wood 110 to be cut and machined wherein the exposed cut or machined surfaces retain a related (e.g., similar) or identical color to that of the exterior surface. This is in contrast to coated or stained modified wood or coated or stained unmodified wood or to unmodified wood which has been colored in-cylinder under conditions of vacuum and/or pressure, where cutting or machining reveals the cut sections to be substantially weaker in color, or even non colored compared to the colored exterior surface. Additionally, since the techniques described herein cause the color to be fixed to all surfaces and regions of the acetylated wood which have been impregnated by the coloring medium, including both the interior and exterior of the acetylated wood, there is minimal leaching out of color or visual color loss by repeated exposure to wet conditions such as those encountered by exposure to wind and rain in exterior constructions or applications. An important, and unexpected, feature of the techniques described herein is that no polymeric binder, resin or other polymerisable chemical monomer is required to fix the color to the exterior and interior of the acetylated wood and so, unlike conventional coatings, which generally rely on a polymeric binder system to fix the color to the surface of the substrate and which can lose color due to degradation and flaking of the binder system when it is exposed to a combination of the ultra violet content of natural daylight and the infrared content of natural sunlight, the colored acetylated wood produced by the techniques described herein is not susceptible to this type of color loss when exposed to weather and the degree to which it loses color from an exterior surface is due largely to destruction of the chromophoric element of the colorant by the cumulative agencies of ultraviolet (UV) radiation, infrared radiation, repeated wet exposure and atmospheric gasses, all included within the process of "weathering" and depends on the specific colorant considered. Thus some colorants, for example C.I. Pigment Red 101, display high resistance to color fade whilst others, such as Pigment Orange 34, are less resistant to color fade and although degree of fade caused by the incidence of UV radiation, visible and infra-red radiation and atmospheric pollutants depends on the chemistry of the specific colorant, the loss of colorant due to 'washing off' when exposed to wet conditions is relatively low.

Accordingly, acetylated wood that is colored on its exterior surface as well as within its interior with the same or similar color can exhibit some of the visually aesthetically pleasing qualities of tropical hardwoods.

Figure 2:
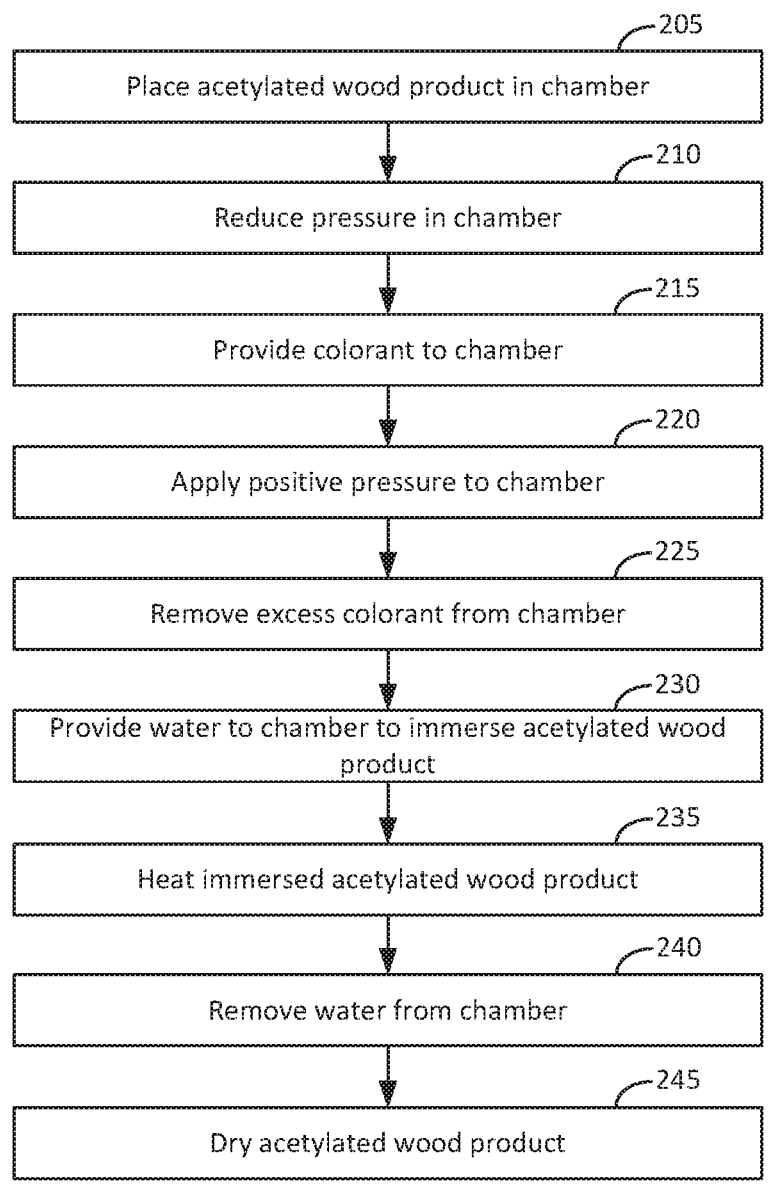
FIG. 2 illustrates a block diagram of the coloration of acetylated wood.
Figure 3A:
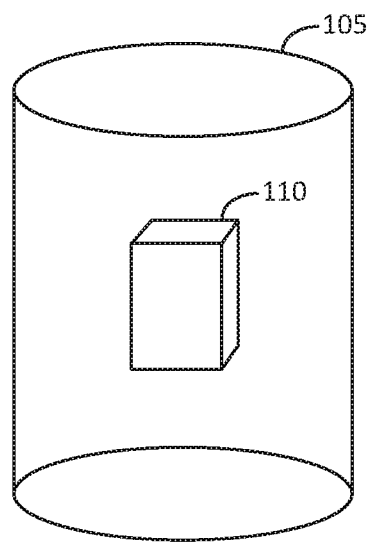
FIGS. 3A-E illustrate examples of the coloration of acetylated wood.

In more detail, FIG. 2 illustrates a block diagram of the coloration of acetylated wood. In FIG. 2, acetylated wood can be placed in a chamber (205). Acetylated wood from very small cross section to very large cross section can be colored by the techniques. For example cross sections such as, but not limited to, 5 cm×1 cm, 10 cm×2.5 cm, 19 cm×2.5 cm decking boards and 15 cm×6 cm structural spars can all be colored by the Method. For example, in the schematic example of FIG. 3A, acetylated wood 110 can be placed in chamber 105. There is no limit on the size of chamber that can be used for the techniques described herein provided it has been appropriately engineered to withstand the degree of vacuum, pressure and heat to bring about the coloration and provided it has been engineered to enable the filling and emptying of liquids and, where the fixation of colorant is to be carried out in the same cylinder as the vacuum impregnation, provided there is provision for the introduction of hot water or steam or hot air or hot inert gas and a means for elevating and maintaining said water, steam, hot air or hot inert gas at a temperature necessary for fixation of colorant. In some implementations, chamber 105 can be large enough to treat 30 to 40 cubic meters of acetylated wood of different or identical cross sectional dimensions, usually arranged in bound packs and can comprise many thousands of pieces of acetylated wood. As previously discussed, acetylated wood is a modified wood product made from softwoods such as *Radiata* Pine via acetylation. Acetylation of wood is a chemical process most commonly, but not necessarily exclusively, accomplished by treating wood with acetic anhydride under pressure and high temperature. One example of acetylated *Radiata* pine (*Pinus Radiata*) is Accoya® by Accsys Group but the range of wood species which can be acetylated is wide and includes, amongst others, for example Southern Yellow Pine, Scots Pine, Spruce, Aspen, Alder, Beech, Birch and Poplar.

Figure 3B:
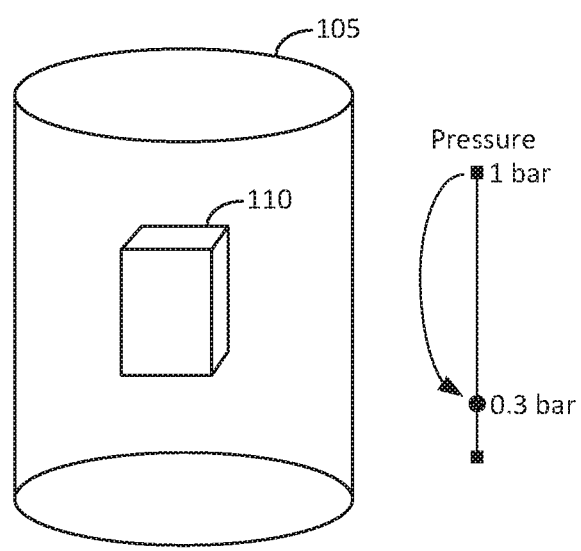

Chamber 105 can then be configured to allow for the vacuum penetration of acetylated wood 110 of a colorant. For example, after acetylated wood 110 has been placed within chamber 105 in FIG. 3A, the atmospheric pressure of chamber 105 can be reduced (210). In the example of FIG. 3B, the atmospheric pressure of chamber 105 has been reduced from 1 bar to 0.3 bar, for example, by having a pump attached to chamber 105 remove air. This results in chamber 105 having a partial vacuum, and therefore, some of the air within chamber 105 and within acetylated wood 110 being removed. In other implementations, chamber 105 can be reduced to an atmospheric pressure between 0.2 bar to 0.8 bar.

Next, a "working solution" or a "working dispersion" of colorant(s) (hereinafter also referred to as the "coloring medium") can be introduced into chamber 105 (215). For example, in FIG. 3C, a diluted solution or a diluted dispersion either of a specific colorant or of a mixture of chemically different colorants corresponding to coloring medium 115 is introduced within chamber 105.

In some implementations, the coloring medium 115 is prepared by mixing a single colorant or a mixture of two or more chemically different colorants, into the chosen liquid medium. The colorant(s) used may be in either powder, granular or liquid form and may themselves consist of one specific colorant or a mixture of two or more chemically different colorants in addition to formulating chemicals including but not limited to dispersants, surfactants, antifoams, humectants, buffers and co-solvents. The liquid medium chosen to prepare the coloring medium may be water or a solvent or a blend of water together with one or more water miscible organic solvents which a) do not cause unacceptable damage to the acetylated wood, b) do not adversely affect the properties of the chosen colorants and c) can be later removed from the resulting colored acetylated wood by an evaporative process. Examples of such solvents include but are not limited to Methanol, Ethanol, 1-Propanol, 2-Propanol, 1-Butanol, 2-Butanol, t-Butyl Alcohol, 1-4 Dioxane. In a preferred implementation the solvent used to prepare the 'working solution' or 'working dispersion' of colorant comprises at least 50% by weight of water. The concentration of the colorant(s) contained within the coloring medium determines the relative intensity of the color conferred to the acetylated wood 110. For example, a coloring medium containing 1% by weight of colorant(s) will confer a paler color to the acetylated wood than if the coloring medium contains 3% of the same colorant(s).

In a preferred implementation the liquid medium employed is largely aqueous and the colorant(s) employed are essentially insoluble in this liquid medium so that the resulting coloring medium is in the form of a particulate dispersion of colorant(s) in the chosen liquid medium. In this implementation the colorants are chosen from the classes of colorant defined by Colour Index International as Pigments (including organic pigments, inorganic pigments and Lakes), (Disperse Dyes, Vat Dyes and Sulfur Dyes and either a single colorant or multiple colorants from within the same Colour Index class or a single or multiple colorants from two or more different Colour Index classes can be used. The selection of suitable colorants includes, but is not limited to: [C.I Pigment Yellows 1, 3, 34, 35, 42, 53, 73, 74, 83, 93, 97, 109, 110, 120, 128, 135, 150, 151, 154, 138, 155, 139, 170, 175, 180, 181, 183, 184, 191, 194, 213], [C.I. Pigment Oranges 20, 36, 38, 43, 62, 64, 66, 71, 72, 73, 78, 82], [C.I. Pigment Reds 31, 48, 48.1, 48.2, 48.3, 48.4, 101, 104, 108, 112, 122, 123, 144, 146, 149, 166, 168, 170, 175, 176, 177, 178, 179, 184, 185, 187, 188, 190, 202, 208, 224, 242, 254, 255, 264, 265, 266, 268, 269, 275], [C.I. Pigment Violets 19, 23, 28, 32], [C.I. Pigment Blues 15.1, 15.2, 15.3, 15.4, 15.5, 15.6, 36, 60], [C.I. Pigment Greens 7, 8, 17, 36, 50], [C.I. Pigment Browns 23, 25, 38], [C.I. Pigment Blacks 7, 11, 26, 28], [C.I. Disperse Yellows 23, 42, 54, 64, 82, 114, 211], [C.I. Disperse Oranges 25, 29, 30, 44, 61, 73, 76], [C.I. Disperse Reds 50, 53, 55, 59, 60, 73, 74, 82, 91, 146, 153, 167, 179, 190, 343, 364], [C.I. Disperse Violets 26, 28, 31, 33, 63, 73, 77, 93], [C.I. Disperse Blues 56, 60, 72, 73, 77, 79, 87, 143, 148, 165, 183.1, 257, 359, 360, 367], [C.I. Disperse Browns 1, 1.1, 19, 27], [C.I. Vat Yellows 1, 33], [C.I. Vat Oranges 1, 2, 3, 9], [C.I. Vat Reds 1, 10, 13, 14, 15, 29, 31, 54], [C.I. Vat Violet 1], [C.I. Vat Blues 4, 6, 13, 14, 15, 18, 20, 43], [C.I. Vat Greens 1, 3, 8, 9, 13], [C.I. Vat Browns 1, 3, 68, 72], [C.I. Vat Blacks 8, 9, 25, 27, 29, 38], [Solvent yellows 16, 163, 193, 232], [Solvent Red 242], [Solvent Violet 11], [Solvent Blues 36, 63, 78, 97, 102], [Solvent Green 3], [C.I. Sulphur Yellows 2, 9], [C.I. Sulphur Orange 1], [C.I. Sulphur Red 6], [C.I. Sulphur Blues 5, 7, 13, 15], [C.I. Blacks 1, 6], [C.I. Sulphur Green 6], [C.I. Sulphur Brown 10].

Additionally, the particle size of the colorant(s) contained in the coloring medium can have a diameter between 0.001 micrometers (microns) to 25 micrometers but preferably most of the particles measured by total volume should be smaller than 5 micrometers. Colorants with a small particle size can be useful because wood and acetylated wood contains "channels" through which the original tree transported water and sap. These channels are microscopically small and, therefore, colorants with an excessively large particle size can clog or block these channels, resulting in less of the colorant(s) being able to penetrate into the interior of acetylated wood 110. Incomplete penetration of colorant particles will in turn lead to incomplete coloration of the interior cross-section of the acetylated wood 110 even though complete and satisfactory coloration of the exterior surfaces does occur. Accordingly, in order fully to color the interior of the acetylated wood the size of the particles of the colorant should be smaller than the size of the channels of the acetylated wood being processed within chamber 105.

In some implementations the coloring medium may also contain other chemical additives which assist, for example, in enhancing the coloration process or which confer other beneficial properties to the acetylated wood. Examples of such additives include, but are not limited to, (i) dispersants or surfactants to assist in maintaining the colorant(s) in a completely dissolved or in a stable finely dispersed form in the coloring medium, (ii) chemicals which modify the hydrophobic/hydrophilic character of the resulting colored acetylated wood, (iii) UV absorbers, light stabilisers or anti-oxidants to prolog the color life of the resulting colored acetylated wood, (iv) chemicals which confer stain blocking effects to the resulting colored acetylated wood, (v) chemicals which reduce corrosivity of the resulting colored acetylated wood, and (vi) biocides.

Figure 3C:
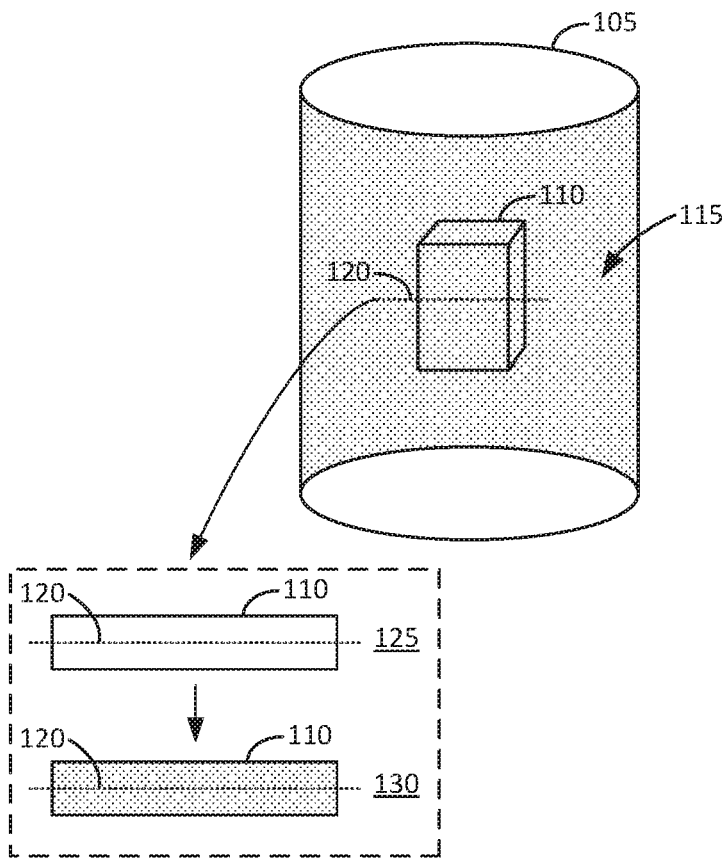

In FIG. 3C, since the atmospheric pressure of chamber 105 has been reduced (e.g., to 0.3 bar as depicted in FIG. 3B) and air has been removed, the coloring medium 115 is able to penetrate deep into the acetylated wood 110 via a process of vacuum impregnation. For example, before the coloring medium 115 has been added to chamber 105, at time 125, acetylated wood 110 has not been penetrated by any coloring medium, as depicted with cross-section 120 in FIG. 3C. However, at time 130, coloring medium 115 has been added to chamber 105. Since the atmospheric pressure of chamber 105 was previously reduced to a partial vacuum (e.g., at 0.3 bar), the coloring medium 115 spreads into vacuum voids within acetylated wood 110 that were created as the result of the air being removed. As a result, at time 130 in FIG. 3C, coloring medium 115 is shown as penetrating throughout the entire solid piece of acetylated wood 110. To ensure increased or improved (e.g., optimum) coloration of the interior of acetylated wood 110 it is useful to allow sufficient time for the vacuum voids to be filled by the coloring medium 115 and this is done by leaving acetylated wood 110 immersed in the coloring medium for the appropriate time. The appropriate immersion time may depend on the size of the cross sections of acetylated wood 110 being colored, with larger cross sections taking longer than smaller cross sections. The appropriate immersion time is normally determined by experimentation before proceeding to full scale manufacture but typically a one hour dwell time is a good starting point. After the pre-determined immersion time, the vacuum is released and the acetylated wood 110 is allowed to remain immersed in the coloring medium for a further period of time, for example 30 minutes, whereby atmospheric pressure assists in ensuring maximum penetration of coloring medium 115 inside the acetylated wood 110. It should be noted as discussed previously that although complete penetration of the acetylated wood by the liquid medium may be achieved, if the particles of colorant are excessively large, full penetration of the particles of colorant themselves will not be achieved.

Optionally, after release of the vacuum described above, positive pressure can also be applied to chamber 105 (220). For example, if the particle size of colorant 110 is relatively large, applying positive pressure (e.g., 10 atmospheres of positive pressure) can assist in pushing more of the coloring medium 115 deeper into acetylated wood 110. Accordingly, more of the colorant particles can also penetrate into the interior of acetylated wood 110.

Optionally, where it is desired to reduce or control the depth of penetration of coloring medium into the acetylated wood 110 the coloring medium can be introduced to chamber 105 without prior application of vacuum. Controlled penetration of coloring medium is then achieved by the application of an appropriate degree of positive pressure.

Figure 3D:
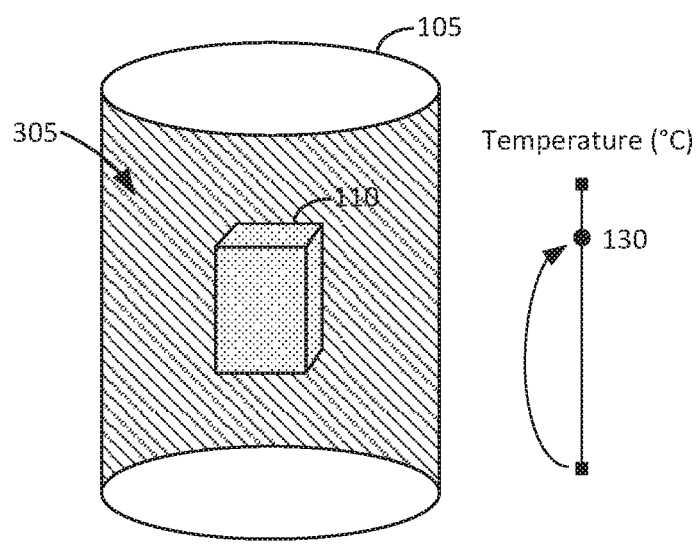
Figure 3E:
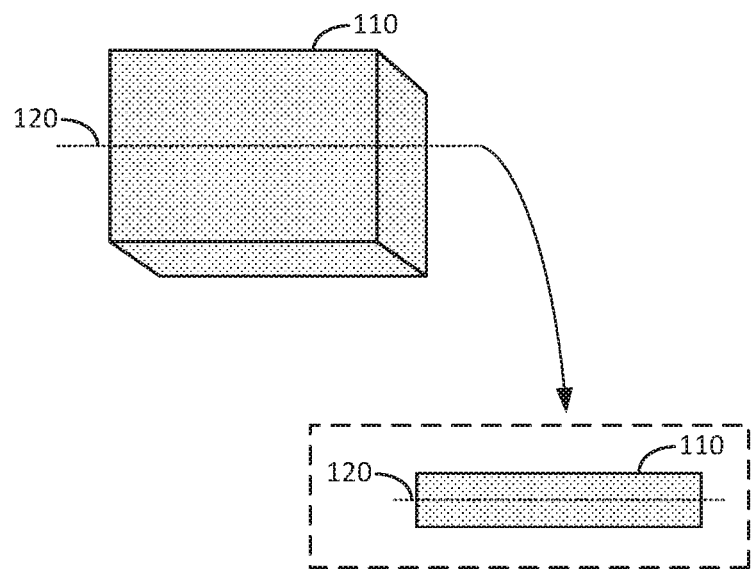

Next, if the objective is to achieve the maximum equality in the intensity of coloration between the interior and exterior of the acetylated wood 110, the excess coloring medium 115 can be removed from chamber 105 (225). For example, the coloring medium 115 can be pumped out of chamber 105 and into a holding tank. The amount of excess coloring medium removed can be less than the total amount of coloring medium originally charged to the chamber 105 because some of it has penetrated into and has been retained by the acetylated wood 110. In this given example, after the excess colorant has been removed, a suitable liquid medium can be provided to chamber 105 to immerse the acetylated wood 110 (230). For example, in FIG. 3D, water 305 has been pumped into chamber 105 such that acetylated wood 110 is fully immersed. In this case the water introduced to the chamber can be cold water or pre-heated water. The chamber 105 is then switched to pressure operating mode and the water 305 can be heated, either by heating elements within chamber 105, or by recirculating through an external heat exchanger or by injection of steam. Since the chamber 105 has been set in pressure operating mode the water can be heated above the normal 100° C. atmospheric pressure boiling point of water without it boiling. For example, water 305 can be heated to between 110° C. and 130° C., whereby the temperature of the acetylated wood 110 eventually reaches the same temperature as the water 305. The acetylated wood 110 within the cylinder 105 is held at the appropriate fixation temperature (for example 110° C.-130° C. but in any case usually above 100° C.) in order to effect fixation of the colorant. The duration of fixation time at high temperature is partly dependent on the cross section of the acetylated wood with larger cross sections requiring longer for the interior of the cross section to attain the desired fixation temperature. In some implementations the acetylated wood needs to be held at fixation temperature for 45-60 minutes but different colorants may require shorter or longer times to effect fixation of the colorant to the acetylated wood 110. The importance of complete immersion of the acetylated wood 110 in the liquid medium (for example water 305) used during the heat fixation step is to create equal hydrostatic pressure around the acetylated wood 110 in order to reduce loss of colorant(s) into the water 305.

If, instead of fixing the colorants by heating the acetylated wood 105 completely immersed in a heated liquid medium as described in [0056] it is intended to fix the colorants by the use of steam or hot air or hot inert gas in the same chamber 105, or by the application of microwave radiation or radio frequency radiation or ultrasonic waves in a different chamber, it can be preferable to remove as much as possible of the excess coloring medium from the impregnated acetylated wood 105 before fixation. This can be done by pumping and draining followed by application a partial vacuum. The additional excess coloring medium which is removed by the partial vacuum can then also be removed by further pumping.

If acetylated wood 110 is heated following penetration of the coloring medium 115 as described above, the colorant does not subsequently migrate away from the interior of acetylated wood 110 when it is dried. That is, the interior of acetylated wood 110 retains a color which is determined by the properties and quantity of the colorant(s) used. Lower temperatures, for example 90° C., have been found to be less effective in fixing the colorant(s) to the acetylated wood 110. The fixation of colorant(s) to acetylated wood 110 is unexpected because the types of dyes and/or pigments used in coloring medium 115 (as discussed above) are not expected to be reactive to acetylated wood. Accordingly, heating acetylated wood 110 at 90° C. and preferably between 110° C. to 140° C. allows for the colorant(s) employed in the coloring medium 115 to be bound to acetylated wood 110 even after it has been dried. That is, the colorant(s) does not migrate away from the interior of acetylated wood 110 upon drying if it has been subjected to the heat treatment described above.

In some implementations the water 305 or other liquid medium used for the fixation of colorant(s) may also contain a co-solvent or chemical additives which confer other beneficial properties to the surface of the acetylated wood 110. Examples of such additives include, but are not limited to, i) dispersants or surfactants to suspend any loose colorant removed from the surface of the acetylated wood 110 during the fixation process, ii) chemicals which modify the hydrophobic/hydrophilic character of the surface of the acetylated wood 110, UV absorbers, light stabilisers or anti-oxidants to prolong the color life of the resulting colored acetylated wood, iv) chemicals which confer stain blocking effects to the surface of the acetylated wood 110, v) biocides.

In some implementations, steam can be used for fixation of the colorant(s) contained within the coloring medium 115 to the acetylated wood 105 instead of the complete immersion in water 305 described above. This can be saturated steam at atmospheric pressure or high temperature steam under pressure. In order to reduce drainage of the coloring medium from the acetylated wood 110 during the steam fixation step, it can sometimes be advisable to apply a secondary vacuum to remove excess coloring medium 115 from the acetylated wood 110 directly after the vacuum impregnation step described above and before the introduction of steam. Excess coloring medium removed by this secondary vacuum can be removed from the chamber 105 and stored ready for the next round of impregnation. In this example any water 305 generated by the application and condensation of steam can be removed from chamber 105 (240) and stored in another container for use in preparing coloring medium for subsequent impregnations of acetylated wood. Next, the colored acetylated wood 110 can be dried (245). For example, acetylated wood 110 can be dried in air by leaving for a time sufficient to allow complete evaporation of residual moisture. Alternatively, the acetylated wood can be kiln dried at elevated temperature or it can be dried by the use of microwave radiation or by any other means off drying wood. In order to accelerate drying and to reduce energy costs it can be advantageous to apply a secondary vacuum after the heat fixation stage in order to remove excess water 305 from the acetylated wood 110.

In some implementations, the coloring medium 115 can include two or more colorants as previously discussed. In some implementations, coloring medium 115 can include one colorant that fades at a faster rate than another colorant. This results in a unique fading effect that can be aesthetically pleasing in some applications.

The above examples describe acetylated wood. However, in other implementations, wood that has been acylated, esterified or etherified by different processes may also be colorized with similar techniques. For example, wood that has been reacted with propionic anhydride, butyric anhydride, ketene, propylene oxide, butylene oxide, methyl isocyanate etc. can also be colorized with similar techniques.

From the foregoing, it will be appreciated that specific embodiments of the invention have been described herein for purposes of illustration, but that various modifications can be made without deviating from the scope of the invention. Accordingly, the invention is not limited except as by the appended claims.

I claim:

1. A method for coloring an acetylated wood product, comprising:
   providing the acetylated wood product in a chamber;
   providing a coloring medium in liquid form containing one or more colorants into the chamber;
   causing the coloring medium to impregnate the acetylated wood product, wherein causing the coloring medium to impregnate the acetylated wood product includes reducing pressure in the chamber to remove air from the acetylated wood product, wherein the coloring medium impregnates the surface and at least some of the interior of the acetylated wood product by replacing the air removed from the acetylated wood product by vacuum impregnation; and
   heating the impregnated acetylated wood product to fix the one or more colorants to any exterior surface or any interior region of the acetylated wood product which has been impregnated by the coloring medium.

2. The method of claim 1, further comprising:
   applying positive pressure following the vacuum impregnation to further promote penetration of the coloring medium into the acetylated wood product.

3. The method of claim 1, further comprising:
   controlling the degree of penetration of the coloring medium into the acetylated wood product by applying positive pressure after providing the coloring medium into the chamber without prior application of vacuum.

4. The method of claim 1, further comprising
without application of vacuum or positive pressure, immersing the acetylated wood product in the coloring medium to effect impregnation by infusion thereby limiting the impregnation largely to the surface so that, after fixation of the one or more colorants, the acetylated wood product is colored chiefly on its exterior surfaces.

5. The method of claim 1, wherein heating the impregnated acetylated wood product effects fixation of the one or more colorants contained within the coloring medium which has impregnated the acetylated wood product.

6. The method of claim 5, wherein the temperature is greater than 90 degrees Celsius (° C.).

7. The method of claim 1 wherein the heat energy required to fix the colorants to the impregnated acetylated wood product is provided by the use of irradiative techniques including one or more of: radio frequency waves, microwaves, or ultrasonic waves.

8. The method of claim 1, wherein the one or more colorants includes one or more of inorganic pigments, organic pigments, disperse dyes, vat dyes, solvent dyes, or sulfur dyes.

9. The method of claim 1 wherein the liquid medium used to prepare the coloring medium includes water.

10. The method of claim 1 wherein the liquid medium used to prepare the coloring medium is comprised of at least 80% water.

11. The method of claim 1, further comprising:
drying the acetylated wood product after fixation of the one or more colorants, wherein those exterior surfaces and interior regions of the acetylated wood product which were impregnated by the coloring medium remain colored after drying.

12. The method of claim 1, wherein the coloring medium penetrates into the acetylated wood product, and further comprising:
replacing some or all of the coloring medium that did not penetrate into the acetylated wood product with a liquid medium comprised of water, wherein the liquid medium is heated or pre-heated to fix the one or more colorants included in the coloring medium to those external surfaces and internal regions of the acetylated wood product impregnated by the coloring medium.

13. The method of claim 10, wherein the liquid medium is comprised of at least 80% water.

14. The method of claim 1, wherein the coloring medium penetrates into the acetylated wood product and further comprising:
removing from the chamber of the coloring medium that did not penetrate into the acetylated wood product and introduction of steam or hot air or hot inert gas to fix the one or more colorants included in the coloring medium to those exterior surfaces and interior regions of the acetylated wood product impregnated by the coloring medium.

15. The method of claim 1, wherein particles of the one or more colorants included in the coloring medium have diameters between 0.001 micrometers (microns) to 25 micrometers.

16. The method of claim 1, wherein particles the one or more colorants included in the coloring medium have diameters between 0.001 micrometers (microns) to 5 micrometers.

17. An acetylated wood product prepared in accordance with the process of claim 1 in which either only the external surfaces or both the external surfaces and at least part of the interior regions are colored.

18. The acetylated wood product of claim 17, the process further comprising:
reducing pressure in the chamber to remove air from the acetylated wood product, wherein the coloring medium impregnates the surface and at least some of the interior of the acetylated wood product by replacing the air removed from the acetylated wood product by vacuum impregnation.

19. The acetylated wood product of claim 17, the process further comprising:
applying positive pressure following the vacuum impregnation to further promote penetration of the coloring medium into the acetylated wood product.

20. The acetylated wood product of claim 17, the process further comprising:
controlling the degree of penetration of the coloring medium into the acetylated wood product by applying positive pressure after providing the coloring medium into the chamber without application of vacuum.

21. The acetylated wood product of claim 17, the process further comprising:
without application of vacuum or positive pressure, immersing the acetylated wood product in the coloring medium to effect impregnation by infusion thereby limiting the impregnation largely to the surface so that, after fixation of the one or more colorants, the acetylated wood product is colored chiefly on its exterior surfaces.

22. The acetylated wood product of claim 17, wherein heating the impregnated acetylated wood product effects fixation of the one or more colorants to the acetylated wood product.

23. The acetylated wood product of claim 22, wherein the temperature is greater than 90 degrees Celsius (° C.).

24. The acetylated wood product of claim 17, wherein the heat energy required to fix the colorants to the impregnated acetylated wood product is provided by the use of irradiative techniques including one or more of: radiofrequency radiation, microwaves, or ultrasonic waves.

25. The acetylated wood product of claim 17, wherein the one or more colorants includes one or more of inorganic pigments, organic pigments, disperse dyes, vat dyes, solvent dyes, or sulfur dyes.

26. The acetylated wood product of claim 17 wherein the liquid medium used to prepare the coloring medium is comprised of water.

27. The acetylated wood product of claim 17 wherein the liquid medium used to prepare the coloring medium is comprised of at least 80% water.

28. The acetylated wood product of claim 17, the process further comprising:
drying the acetylated wood product after fixation of the one or more colorants, wherein those exterior surfaces and internal regions of the acetylated wood product that were impregnated by the coloring medium remain colored after drying.

29. The acetylated wood product of claim 17, wherein the coloring medium penetrates into the acetylated wood product, the process further comprising:
replacing some or all of the coloring medium that did not penetrate into the acetylated wood product with a liquid medium including water, wherein the liquid medium is heated or pre-heated to fix the one or more colorants included in the coloring medium to those external surfaces and internal regions of the acetylated wood product impregnated by the coloring medium.

30. The acetylated wood product of claim 29 wherein the liquid medium is comprised of at least 80% water.

31. The acetylated wood product of claim 17 wherein the coloring medium penetrates into the acetylated wood product and further comprising:
removal from the chamber of the coloring medium that did not penetrate into the acetylated wood product and introduction of steam or hot air or hot inert gas to fix the one or more colorants included in the coloring medium to those exterior surfaces and interior regions of the acetylated wood product impregnated by the coloring medium.

32. The acetylated wood product of claim 17, wherein particles of the one or more colorants included in the coloring medium have diameters between 0.001 micrometers (microns) to 25 micrometers.

33. The acetylated wood product of claim 17, wherein particles of the one or more colorants included in the coloring medium have diameters between 0.001 micrometers (microns) to 5 micrometers.

34. A method of coloring an interior and an exterior of a chemically modified wood product, comprising:
providing the modified wood product in a chamber;
providing a coloring medium in liquid form including one or more colorants into the chamber;
causing the coloring medium to impregnate the modified wood product and then heating or irradiating the impregnated modified wood product to fix the one or more colorants to any exterior surface or internal region of the modified wood product which has been impregnated by the coloring medium, wherein causing the coloring medium to impregnate the modified wood product includes reducing pressure in the chamber to remove air from the modified wood product, wherein the coloring medium impregnates the exterior surface and at least some of the interior region of the modified wood product by replacing the air removed from the modified wood product by vacuum impregnation.

35. The method of claim 34, wherein the one or more colorants includes one or more of inorganic pigments, organic pigments, disperse dyes, vat dyes, solvent dyes, or sulfur dyes.

36. The method of claim 34, wherein coloring the modified wood product includes heating the modified wood product impregnated with the coloring medium to a temperature exceeding 90° C. to effect fixation of the one or more colorants to the modified wood product.

* * * * *